United States Patent
Woodard et al.

(10) Patent No.: US 7,140,589 B2
(45) Date of Patent: Nov. 28, 2006

(54) CUSHION LIFT FOR SEAT ASSEMBLY

(75) Inventors: Craig B Woodard, Franklin, TN (US); William D Lamb, Lebanon, TN (US)

(73) Assignee: Orchid Automation, LLC, Brentwood, TN (US)

( * ) Notice: Subject to any disclaimer, the term of this patent is extended or adjusted under 35 U.S.C. 154(b) by 171 days.

(21) Appl. No.: 10/732,548

(22) Filed: Dec. 10, 2003

(65) Prior Publication Data

US 2005/0127250 A1    Jun. 16, 2005

(51) Int. Cl.
- F16M 13/00 (2006.01)
- A47C 1/06 (2006.01)
- B60N 2/02 (2006.01)

(52) U.S. Cl. .................. 248/421; 248/157; 297/344.17; 296/65.06

(58) Field of Classification Search ................ 248/157, 248/422, 421, 424, 561; 297/331, 336, 344.11, 297/344.13, 237; 296/65.05, 65.06
See application file for complete search history.

(56) References Cited

U.S. PATENT DOCUMENTS

| | | | | |
|---|---|---|---|---|
| 2,418,787 A * | 4/1947 | Nelson | .......................... | 297/34 |
| 3,149,815 A * | 9/1964 | Cotter et al. | ................. | 248/421 |
| 4,043,529 A | 8/1977 | Pickles | | |
| 4,781,353 A * | 11/1988 | Nishino | ........................ | 248/395 |
| 4,986,509 A * | 1/1991 | Suzuki et al. | ................ | 248/396 |
| 5,154,402 A * | 10/1992 | Hill et al. | .................... | 267/133 |
| 5,224,750 A * | 7/1993 | Clark et al. | .............. | 296/65.06 |
| 5,472,165 A * | 12/1995 | Gruber | ........................ | 248/424 |
| 5,636,884 A | 6/1997 | Ladetto et al. | | |
| 5,782,533 A | 7/1998 | Fischer et al. | | |
| 5,882,061 A | 3/1999 | Guillouet | | |
| 5,967,471 A * | 10/1999 | Borlinghaus et al. | ........ | 248/157 |
| 5,997,083 A * | 12/1999 | Ono et al. | .................... | 297/237 |
| 6,007,039 A | 12/1999 | Olsson et al. | | |
| 6,309,019 B1 | 10/2001 | Downey et al. | | |
| 6,488,337 B1 * | 12/2002 | De Voss et al. | ......... | 297/344.13 |
| 6,578,919 B1 * | 6/2003 | Seibold et al. | .............. | 297/331 |
| 6,773,069 B1 * | 8/2004 | Kaneko et al. | ......... | 297/344.17 |
| 6,851,753 B1 * | 2/2005 | Akaike et al. | ......... | 297/344.17 |

* cited by examiner

Primary Examiner—Anita M. King
(74) Attorney, Agent, or Firm—Baker & Daniels LLP

(57) ABSTRACT

A cushion lift assembly for raising and lowering the front and rear portions of an automobile seat independently and/or simultaneously. The cushion lift assembly includes mounting members and a pair of connecting members interconnecting the mounting members. The connecting members are formed from three stamped members including a first elongated stamped member and two bracket members mounted near opposite ends of the first stamped member. Each of the stamped members includes a rib formed therein. The ribs cooperate to define an annular opening in which a pivot member is received.

16 Claims, 5 Drawing Sheets

FIG_1

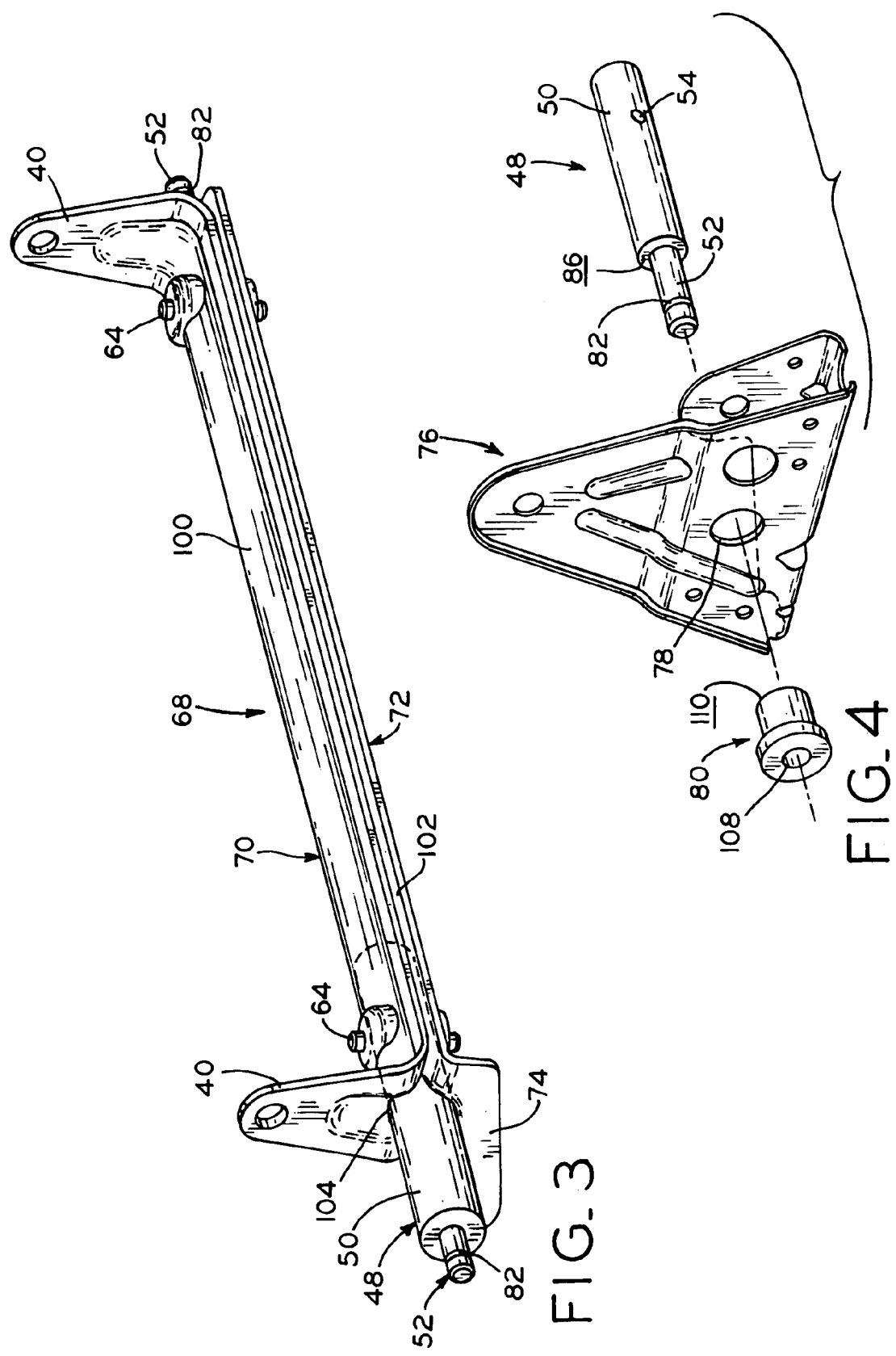

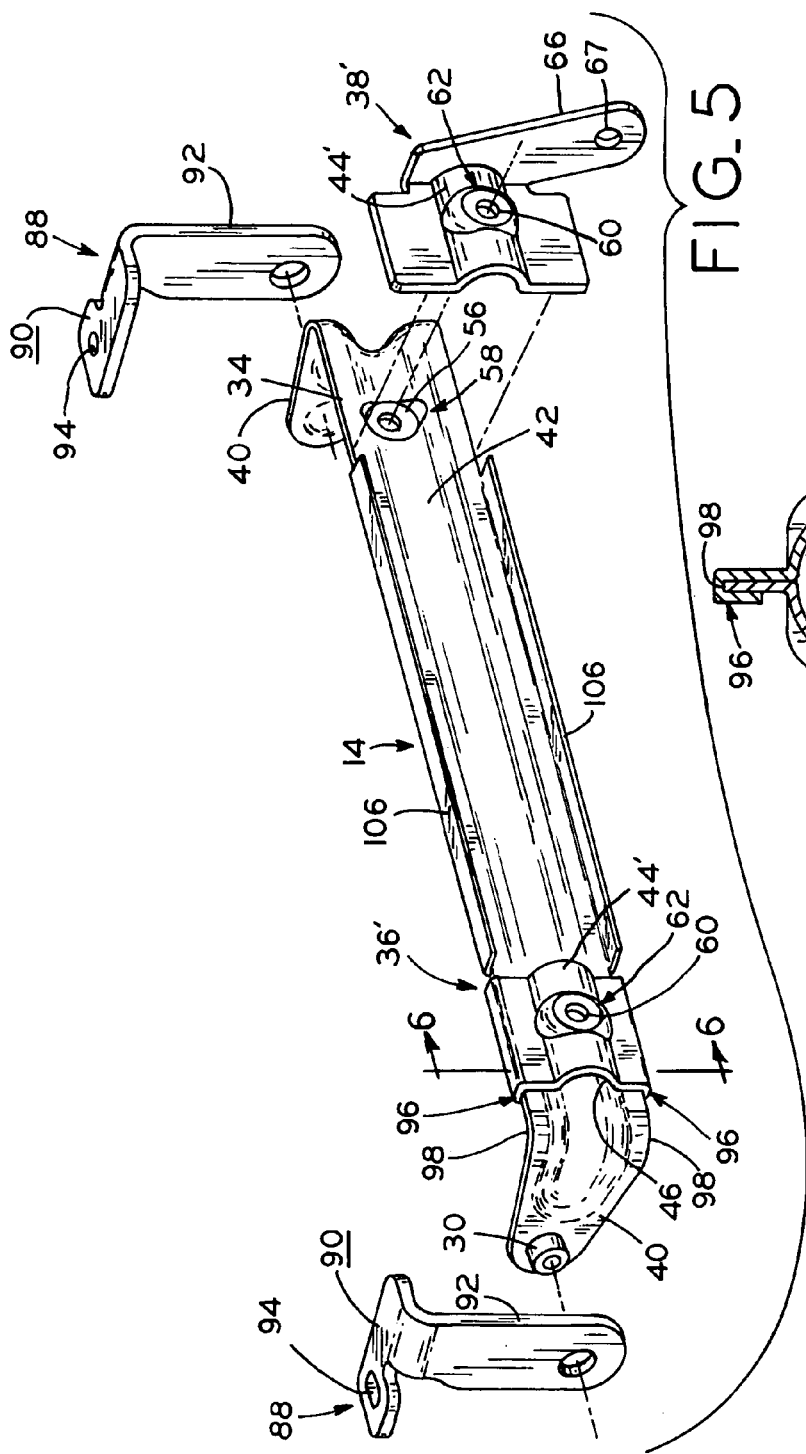
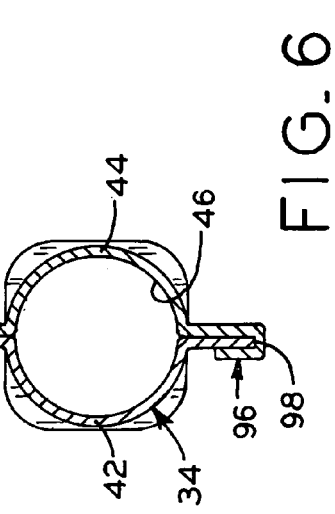
FIG. 5
FIG. 6

CUSHION LIFT FOR SEAT ASSEMBLY

BACKGROUND OF THE INVENTION

1. Field of the Invention

The present invention relates to a lift assembly for the seat of an automobile.

2. Description of the Related Art

Automobile seats provided with power seat adjusters include a mechanism designed to raise and lower the seat in a substantially vertical direction. This mechanism is a cushion lift assembly having mounting members to which the automobile seat is secured. The mounting members are positioned substantially parallel to one another with a pair of connecting members interconnecting opposite ends of the mounting members. The cushion lift assembly also includes mounting points for electric motors which are provided to cause rotation of the connecting members and thus the seat.

Several methods may be used to link the connecting members and the mounting members. One such method includes a mechanical linkage which is the subject of U.S. patent application Ser. No. 10/164,859, assigned to the assignee of the present invention. The swage mechanical linkage of the above-identified patent application is used to interconnect the connecting members and mounting members. The connecting members are formed from tubing and are provided with inserts fixedly received in each end thereof. The insert has a large diameter portion fixedly received in the connecting tube and a smaller diameter portion providing a bearing surface for the cushion lift assembly. The end of the tube having the insert mounted therein is received within an aperture formed in a linkage. The linkage is used to link the connecting member and the mounting member such that the opposite end of linkage is secured to the mounting member. The smaller diameter portion of the insert engages a track mounted in the automobile to mount the cushion lift assembly therein. Electric motors are also mounted on the track to actuate the connecting members and thus the cushion lift assembly to raise and lower the front and rear portions of the seat either independently and/or simultaneously.

Alternatively, the insert portion of the assembly may be integrally formed with a solid rod or connecting tube having uniform strength along its length, or secured thereto by welding, brazing or the like.

These methods of manufacturing the cushion lift assembly can be problematic and expensive. With the swage concept, assembly of multiple components requires additional time and thus increases labor costs. The use of the welded linkages has problems including increased cost, the potential for cold welds wherein the weld metal does not penetrate the base metal, and warping of components during the welding process. Additionally, the use of tubing for the connecting member may be costly and the tolerances may be loose.

SUMMARY OF THE INVENTION

The present invention provides a mechanical linkage assembly for a seat adjustment device for an automobile seat. The mechanical linkage assembly is a cushion lift assembly provided to raise and lower the front and rear portions of the automobile seat independently and/or simultaneously. The cushion lift assembly includes mounting members positioned substantially parallel to one another and a pair of connecting members, also positioned parallel to one another. The connecting members are secured to the ends of the mounting members to interconnect the mounting members. The connecting members are formed from three stamped members secured to one another by any suitable method. The stamped members include a first elongated member having a length which extends between the mounting members, and two bracket members which are mounted near opposite ends of the first stamped piece. Each of the stamped members includes a rib formed therein which together define an annular opening in which an insert is received. A pin extends through each of the stamped members and the insert with the ends of the pin being deformed to secure the position of the insert. The insert is then mounted to a conventional bracket located in the automobile. An electric motor may be mounted to one of the inserts of each connecting member to pivot the connecting members and cause the automobile seat to be raised and lowered.

An advantage of the present invention is that by eliminating the use of tubing as the connecting members, manufacturing of the cushion lift assembly is less expensive.

A further advantage of the present invention is that tighter tolerances may be achieved. Additionally, manufacturing and assembly of the cushion lift assembly may be automated, thus reducing the amount of time required to produce the assembly and the cost of the assembly.

Another advantage is that by stamping the components of the cushion lift assembly, the components may be easily and inexpensively strengthened at locations of high stress.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 3 is a perspective view of an alternative embodiment of a mounting member of the cushion lift assembly of the present invention.

FIG. 4 is a perspective view of a mounting bracket for the cushion lift assembly of the present invention.

FIG. 5 is an exploded perspective view of an alternative embodiment of a mounting member of the cushion lift assembly of the present invention.

FIG. 6 is a sectional view of the mounting member of FIG. 5 taken along line 6—6.

Figure 1:
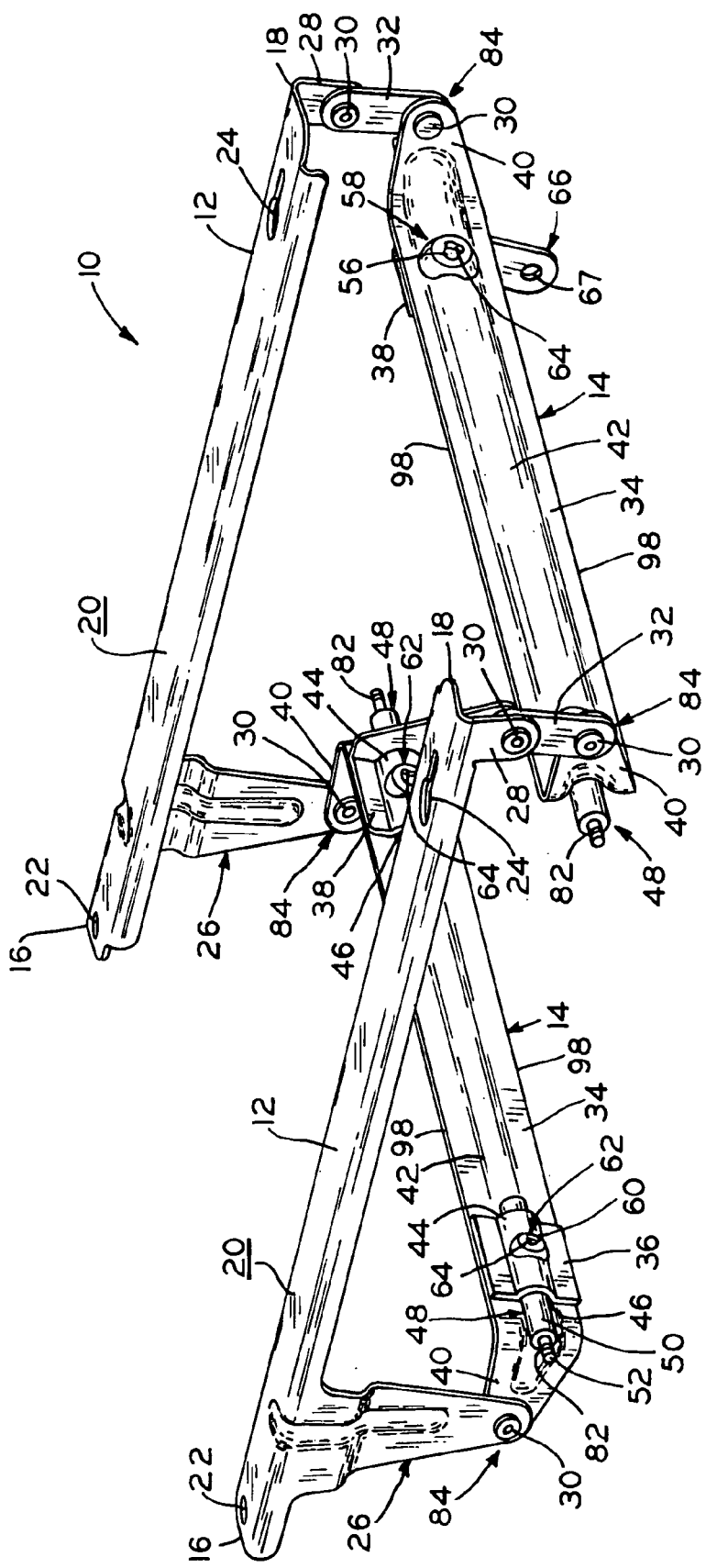
FIG. 1 is a perspective view of the cushion lift assembly in accordance with the present invention.

Corresponding reference characters indicate corresponding parts throughout the several views. Although the exemplification set out herein illustrates embodiments of the invention, in one form, the embodiment disclosed below is not intended to be exhaustive or to be construed as limiting the scope of the invention to the precise form disclosed.

DESCRIPTION OF THE PRESENT INVENTION

Referring to FIG. 1, cushion lift assembly 10 defines part of a manual or power seat adjuster for an automobile seat (not shown). Cushion lift assembly 10 is provided to raise and lower the front and rear portions of the seat in a substantially vertical direction. Cushion lift assembly 10 is mounted on a track in an automobile to support the seat. Through operation of a motor and lift assembly 10, adjustments may be made to the front and rear seat portions independently and/or simultaneously.

Figure 2:
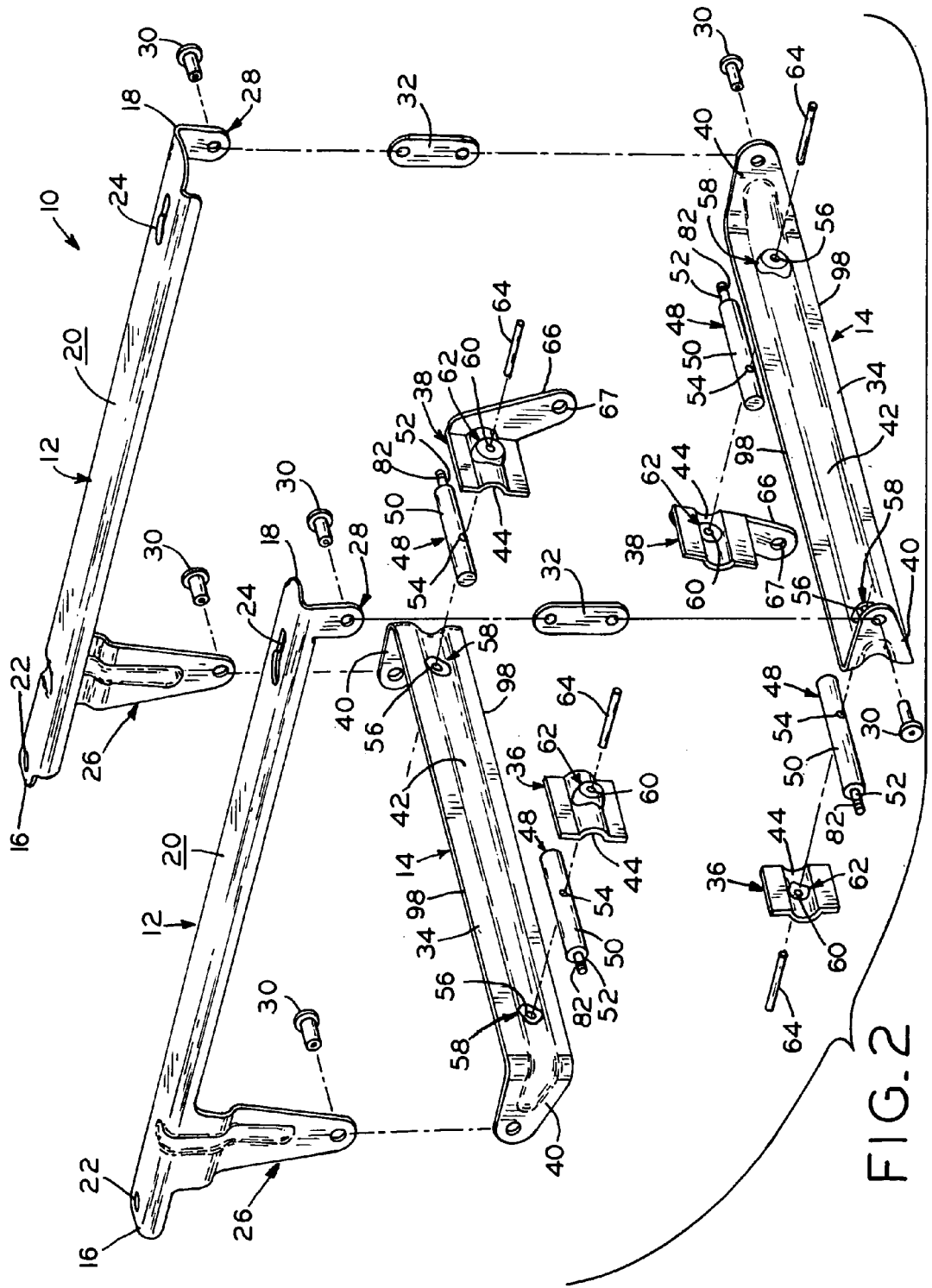
FIG. 2 is an exploded perspective view of the cushion lift assembly of FIG. 1.

As illustrated in FIGS. 1 and 2, cushion lift assembly 10 includes a pair of mounting members 12 positioned substantially parallel to one another. Mounting members 12 have ends 16 and 18, with each end 16 being linked by a first connecting member 14 and each end 18 being linked by a second connecting member 14. Mounting members 12 and connecting members 14 are formed by a method such as stamping from any suitable high strength material able to withstand the forces acting thereon during everyday use. Such material may include a low alloy steel. Mounting members 12 have substantially flat surfaces 20 with apertures 22 and 24 located therein. The automobile seat is secured to cushion lift assembly 10 by the use of fasteners engaging both the seat and respective apertures 22 and 24. Additionally, apertures 24 are illustrated as being key holes to allow a pin, for example, extending from the automobile seat to engage the larger diameter opening of aperture 24 and be slid into a locked position, thus allowing for ease of assembly. Integrally formed with each mounting member 12 are brackets 26 and 28 extending downwardly, substantially perpendicularly from surfaces 20. Brackets 26 and 28 may be of any suitable size and shape to adequately connect mounting members 12 and connecting members 14.

Referring to FIG. 5, an alternative embodiment of mounting members 12 is shown. In this embodiment, mounting members 88 are used in place of mounting members 12 with the mounting members being shortened such that they do not span the distance between connecting members 14. In this embodiment, the support for the seat provided by mounting members 12 is put into the automobile seat cushion, thus reducing the amount of material and cost of cushion lift assembly 10. One mounting member 88 is secured to each end of connecting members 14. Mounting members 88 include flat surface 90 having downwardly depending bracket 92 integrally formed with and extending therefrom. Apertures 94 are formed in flat surface 90 for securing the automobile seat to mounting members 88. Mounting members 88 secured to the opposite connecting member 14 not shown in FIG. 5 may be provided with key holes similar to apertures 24 located in mounting member 12. This allows for ease of assembly when mounting the automobile seat to the cushion lift assembly.

The first connecting member 14 is pivotally secured directly to brackets 26 or 92 by any suitable fastening means including, e.g., a bolt, rivets 30, or the like. As illustrated in the embodiment of FIG. 5, rivets 30 may be integrally formed with connecting members 14. The second connecting member 14 is connected to bracket 28 through link 32 (FIGS. 1 and 2) having one end pivotally secured to bracket 28 and its opposite end pivotally secured to connecting member 14, also by rivets 30.

Connecting members 14 are formed by stamping using any suitable high strength material such as low alloy steel. The thickness of the stamped parts may range from 2.5 to 4 mm, or any other suitable dimension depending on the requirements of the assembly. Connecting members 14 include elongated support member 34 having a plurality of brackets, such as brackets 36 and 38, secured thereto. Elongated support member 34 is substantially U-shaped having upturned portions 40 at the ends thereof for securing connecting members 14 to mounting members 12. Extending along the length of support member 34 is rib portion 42 for providing strength to member 34.

In one embodiment shown in FIGS. 1 and 2, connecting members 14 includes three parts, elongated support member 34, first bracket 36, and second bracket 38. First and second brackets 36 and 38 are secured to support member 34 near opposite ends of the substantially linear portion thereof by any suitable method. In this embodiment, brackets 36 and 38 are secured to elongated support member 34 by a method including welding, toxing, or the like. Brackets 36 and 38 have rib portions 44 and, when secured to elongated support member 34, rib portions 42 and 44 form openings 46 (FIG. 1) for pivot members or inserts 48.

An alternative embodiment shown in FIGS. 5 and 6 includes brackets 36' and 38' mechanically fastened to elongated support member 34 by a farther method. Brackets 36' and 38' may be provided with flanged portions 96 that folds over opposite outer edges 98 of elongated support member 34. Brackets 36' and 38' also have rib portions 44' which align with ribbed portion 42 in elongated support member 34 to form openings 46 (FIG. 1) for inserts 48.

Referring to FIG. 3, a third alternative embodiment of connecting member 14 is illustrated. Connecting member 68 includes upper elongated support member 70. In this embodiment, brackets 36 and 38 are replaced by a single elongated, lower support member 72. Ribs 100 and 102 in upper and lower support members 70 and 72 define opening 104 for receiving insert 48. Lower support member 72 is provided with arms 74 which are equivalent to arms 66 to provide attachment means for the actuating lever arms or motors (not shown).

Strength may be added to connecting members 14 at any desired point along elongated support member 34. As discussed above, rib portions 42, 100, and 102 are provided along the length of elongated support members 34, 70, and 72 to add strength to connecting members 14 and 68. However, rib portions 42 may be any suitable length to receive insert 48 and don't have to extend the entire length of support members 34, 70, and 72. In addition, elongated support members 34, 70, and 72 may be provided with a rib portion centrally located along the member to add strength to the middle thereof. Referring to FIG. 5, additional material may be added to one or both of opposite outer edges 98 of elongated support member 34 in the form of flange 106 which is bent to provide additional strength. By bending flange 106, the material is work hardened, further increasing the strength of elongated support member 34. Flange 106 is illustrated as being bent substantially at a 90 degree angle to support member 34, however, the flange may be bent to any suitable angle including being bent over to abut the elongated support member. Flange 106 may also extend any desired length of support member 34, or may include a plurality of shorter flanges. The strength may also be increased in portions of elongated support member 34 by increasing the thickness of the member. A further alternative to increasing the strength of elongated support member 34 is to secure one or more additional brackets thereto, thus adding material to certain areas of member 34 and strengthening connecting member 14.

Referring to FIG. 4, insert 48 is substantially cylindrical including main body portion 50 having a diameter substantially equivalent to opening 46 and 104. Extending from one end of main body portion 50 of insert 48 is smaller diameter portion 52 which operatively links cushion lift mechanism 10 to a track mounted in the automobile via bracket 76, 76' (FIGS. 4 and 7) as will be discussed further hereinbelow.

Inserts 48 may be secured within openings 46 and 104 by any suitable mechanical interference. One such securing method is illustrated in FIG. 2. Inserts 48 are provided with apertures 54 that extend through main body portion 50. Aperture 54 aligns with aperture 56 in boss 58 formed in elongated support members 34, 70 and 72 and aperture 60 in boss 62 formed in brackets 36, 36' and 38, 38'. A pin 64 is positioned within aligned apertures 56, 54 and 60 and extends a suitable length beyond the exterior surfaces of bosses 58 and 62 (FIG. 1). The exposed ends of pin 64 are deformed by any suitable method to secure the position of inserts 48. Pins 64 are formed from any suitable deformable material able to withstand shear stresses exerted thereon. Alternatively, smaller portion 52 of insert 48 may be provided with a groove. A portion of bracket 36, 36' and 38, 38' is pressed into the groove to lock insert 48 within openings 46 and 104. Insert 48 may also be interference fitted in openings 46 and 104 by heat shrinking, for example.

In order to ensure a tight fit between insert 48, elongated member 34, and either bracket 36, 36' or 38, 38', ribbed portions 42 and 44 will be sized during the manufacturing process. The ribbed portions are formed having a diameter which is smaller than required by insert 48. During manufacturing, a hardened sphere, or other suitably shaped member, is forced into opening 46 to increase the diameter thereof to the size required by insert 48. The same method is used to size opening 104 in connecting member 68. For example, openings 46 and 104 may be formed having an estimated tolerance of ±0.05 mm.

Cushion lift assembly 10 may be adjusted manually or through the use of an electric motor. Referring to FIGS. 1, 2, and 5, brackets 38, 38' are provided with arms 66 extending substantially downwardly from the outer edge of the bracket which are mechanically connected to the manual or power adjusting means. Arms 66 are each provided with an aperture 67 for mounting connecting members 14 to a lever arm (not shown) through a gear system for example for manual operation or to an electric motor (not shown) for powered adjustment. The gear system or motors are mounted on a track in the automobile and, when actuated, push and pull against arms 66 to adjust the automobile seat.

When mounting cushion lift assembly 10 to the track of an automobile, smaller diameter portion 52 of insert 48 is secured to bracket 76, 76' (FIGS. 4 and 7) which is in turn mounted to the track. In a first embodiment of bracket 76 shown in FIG. 4, aperture 78 is formed in bracket 76 to receive bushing 80. Bushing 80 is secured within aperture 78 by any suitable means including welding, brazing, or the like. Smaller diameter portion 52 of insert 48 is received in aperture 108 formed in bushing 80 with surface 86 of insert 48 engaging surface 110 of bushing 80. Smaller diameter portion 52 is provided with groove 82. A fastener such as a small self-tapping screw, spring clip, washer, or the like will engage smaller diameter portion 52. The tip of a self-tapping screw, for example, would bottom out in groove 82 providing a positive engagement with the tracks. Alternatively, the fastener may be used for shipping purposes only and may be removed after cushion lift assembly 10 has been mounted in the automobile. In this embodiment, as connecting member 14 pivots, smaller diameter portion 52 rotates within bushing 80.

Figure 7:
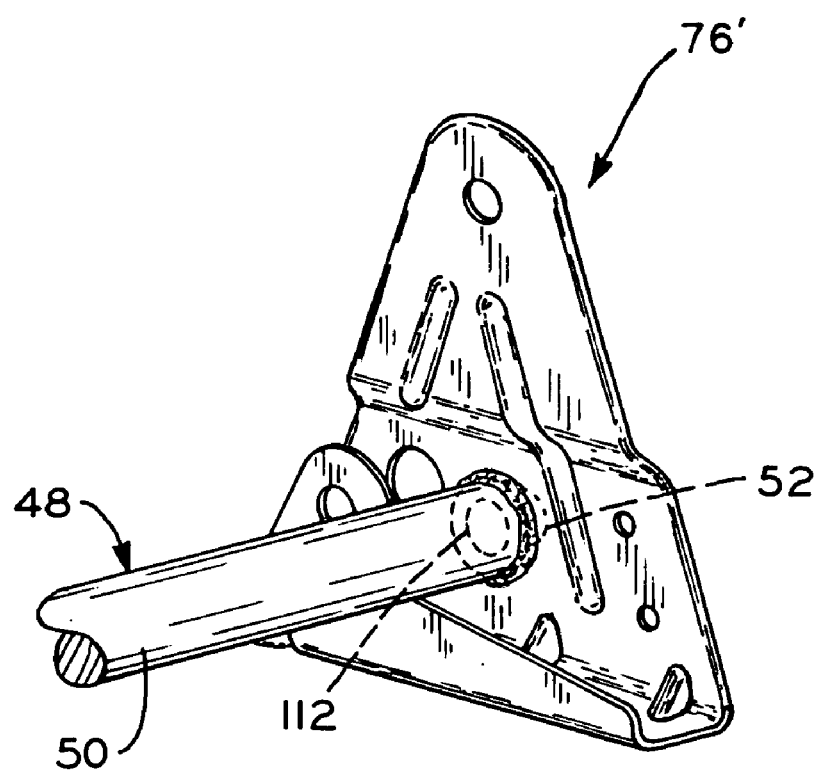
FIG. 7 is a perspective view of an alternative embodiment of a mounting bracket for the cushion lift assembly of the present invention.

Referring to FIG. 7, a second embodiment of bracket 76 is illustrated. In this embodiment, insert 48 is fixedly mounted to bracket 76'. Bracket 76' is provided with aperture 112 sized to receive smaller diameter portion 52 of insert 48. Insert 48 is then secured to bracket 76' by any suitable method including welding, brazing, or the like. Main body portion 50 of insert 48 is then received in opening 46 and 104 such that connecting members 14 and 68 pivot about insert main body portion 50.

During operation of cushion lift mechanism 10, the lever arms or electric motors (not shown) are actuated. Upon actuation and, depending on whether the seat is being raised or lowered, the lever arm or motor pushes or pulls against arm 66. If the lever arms or motors push outwardly against arm 66 from the position shown in FIG. 1, connecting member 14 pivots about connecting points 84 (FIG. 1) with mounting members 12. The connecting members rotate in a direction such that upturned portions 40 of elongated support member 34 are substantially parallel with brackets 26 and 28 and away from the substantially perpendicular position shown in FIG. 1. As connecting members 14 move in this direction, the front and/or rear portions of the seat are raised. The maximum distance the seat can be raised is directly related to the length of upturned portions 40. Consequently, operation of the lever arms or motors in a reverse direction of that described above in which the lever arms or motors pull arms 66 inwardly causes connecting members 14 to rotate about connecting points 84, returning to the substantially perpendicular position shown in FIG. 1. As connecting members 14 return to the FIG. 1 position, the front and/or rear seat portions are lowered.

While this invention has been described as having an exemplary design, the present invention may be further modified within the spirit and scope of this disclosure. This application is therefore intended to cover any variations, uses, or adaptations of the invention using its general principles.

What is claimed is:

1. A cushion lift assembly for use in an adjustable vehicle seat, said assembly comprising:
    a plurality of elongate mounting members formed from substantially planar sheet stock material;
    a plurality of elongate connecting members formed from substantially planar sheet stock material, said connecting members pivotally connected to said mounting members;
    a plurality of pivot members secured to said connecting members for pivotally mounting said cushion lift assembly to a track; and
    a plurality of brackets, each one of said brackets and one of said connecting members defining apertures therebetween into which one said pivot member is disposed to thereby secure said pivot members to said connecting members.

2. The assembly of claim 1 and further comprising a plurality of links securing said mounting members to said connecting members.

3. The assembly according to claim 1 wherein said connecting members include ribs which extend substantially along the entire length of said connecting members, said ribs and said brackets defining said apertures.

4. The assembly according to claim 3 wherein said pivot members, said brackets, and said connecting members are secured together by means of a pin.

5. The assembly according to claim 1 wherein said pivot members are adapted to pivotally support a said vehicle seat.

6. The assembly according to claim 1 wherein said pivot members are substantially cylindrical and include an insertion portion for inserting into said apertures, and a pivoting portion for pivotally supporting said vehicle seat.

7. The assembly according to claim 1 wherein said connecting members are substantially U-shaped.

8. The assembly according to claim 1 wherein said brackets and said connecting members each include a rib, each said rib in one said bracket and one said associated connecting member rib defining said aperture.

9. A cushion lift assembly for use in an adjustable vehicle seat, said assembly comprising:
- a plurality of elongate mounting members formed from substantially planar sheet stock material;
- a plurality of elongate connecting members formed from substantially planar sheet stock material;
- a plurality of links interconnecting said connecting members and mounting members;
- a plurality of pivot members secured to said connecting members for pivotally mounting said cushion lift assembly to a track; and
- a plurality of brackets, each one of said brackets and one of said connecting members defining an aperture therebetween into which one said pivot member is disposed to thereby secure said pivot members to said connecting members.

10. The assembly according to claim 9 wherein said connecting members include ribs which extend substantially along the entire length of said connecting members, said ribs and said brackets defining said apertures.

11. The assembly according to claim 10 wherein said pivot members, said brackets, and said connecting members are secured together by means of a pin.

12. The assembly according to claim 11 wherein said pivot members are substantially cylindrical and include an insertion portion for inserting into said apertures and a pivoting portion for pivotally supporting said cushion lift.

13. A cushion lift assembly for use in an adjustable vehicle seat, said assembly comprising:
- a plurality of elongate mounting members formed from substantially planar sheet stock material;
- a plurality of elongate connecting members formed from substantially planar sheet stock material, each said connecting members including ribs which extend substantially along the entire length of said connecting members;
- a plurality of links interconnecting said mounting members to said connecting members;
- a plurality of brackets, said brackets and said connecting members defining apertures; and
- a plurality of pivot members disposed in said apertures for pivotally mounting said cushion lift assembly to a track.

14. The assembly according to claim 13 wherein one said pivot member, one said bracket, and one said connecting member are secured together by means of a pin.

15. The assembly according to claim 13 wherein said pivot members are adapted to pivotally support said vehicle seat.

16. The assembly according to claim 13 wherein said connecting members are substantially U-shaped.

* * * * *